Figure 1:
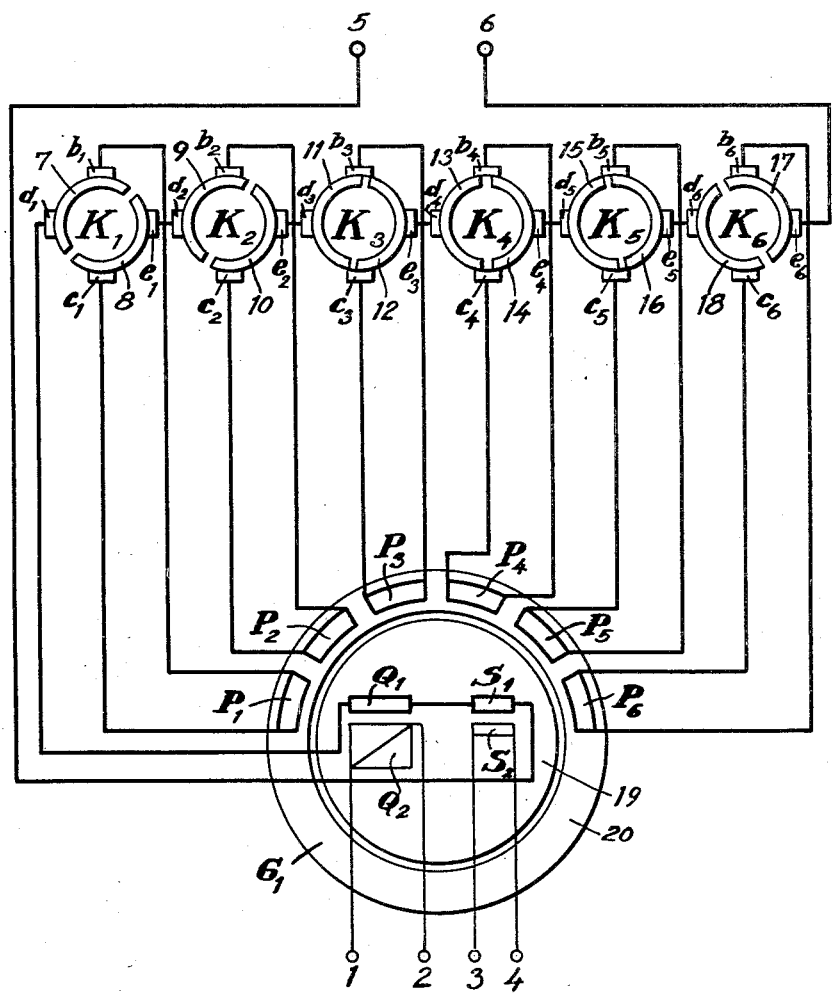

Jan. 28, 1936.     J. E. ALM     2,029,212
ELECTRICAL DIRECT CURRENT SYSTEM
Filed Feb. 10, 1934     13 Sheets-Sheet 1

INVENTOR
Johan Emil Alm
BY
Wm. J. Hedlund
his ATTORNEY

Jan. 28, 1936.  J. E. ALM  2,029,212

ELECTRICAL DIRECT CURRENT SYSTEM

Filed Feb. 10, 1934  13 Sheets-Sheet 2

INVENTOR
Johan Emil Alm
BY
Wm. J. Hedlund
his ATTORNEY

Jan. 28, 1936.  J. E. ALM  2,029,212

ELECTRICAL DIRECT CURRENT SYSTEM

Filed Feb. 10, 1934  13 Sheets-Sheet 3

INVENTOR
Johan Emil Alm
BY
W. J. Hedlund
his ATTORNEY

INVENTOR
Johan Emil Alm
BY
his ATTORNEY

Jan. 28, 1936.  J. E. ALM  2,029,212
ELECTRICAL DIRECT CURRENT SYSTEM
Filed Feb. 10, 1934   13 Sheets-Sheet 6

Jan. 28, 1936. J. E. ALM 2,029,212
ELECTRICAL DIRECT CURRENT SYSTEM
Filed Feb. 10, 1934 13 Sheets-Sheet 8

INVENTOR
Johan Emil Alm
BY
Wm. J. Hedlund
his ATTORNEY

Jan. 28, 1936.  J. E. ALM  2,029,212
ELECTRICAL DIRECT CURRENT SYSTEM
Filed Feb. 10, 1934  13 Sheets-Sheet 13

INVENTOR
Johan Emil Alm
BY
Wm J. Hedlund
his ATTORNEY

Patented Jan. 28, 1936

2,029,212

UNITED STATES PATENT OFFICE 2,029,212

ELECTRICAL DIRECT CURRENT SYSTEM

Johan Emil Alm, Stockholm, Sweden, assignor to Baltzar Carl Von Platen, Stockholm, Sweden Application February 10, 1934, Serial No. 710,703
In Sweden February 22, 1933

26 Claims. (Cl. 171—123)

The invention is concerned with the problem arising in connection with the rectification of alternating voltages into continuous voltages or vice versa, especially at high voltages and/or amperages, and is of particular interest in electrical machine sets for converting mechanical energy to electrical energy or vice versa which sets comprise synchronous generators or motors of the heteropolar type having two or more phase windings which latter are in cooperation with a number of commutators for the rectification of the induced alternating voltages. By heteropolar machines are understood such machines in which consecutive field poles are unlike, that is, alternately of north and south polarity. In certain embodiments of such systems it is desirable that the induced alternating voltages have definite zero-voltage intervals during which the phase windings are short-circuited each by one of the commutators and alternating currents passing through the windings are commutated and the alternating voltages rectified, which latter may be added or superposed to produce a substantially constant continuous voltage through series-connection of the commutators provided the induced voltage wave form is suitable for the purpose, compare for instance the French Patent No. 662,800. When the system operates as a generator, a direct current substantially proportional to the load is delivered from the terminals, whereas in operating as a motor a direct current substantially proportional to the mechanical load must be supplied to the terminals.

It has been previously proposed, for instance in said French patent to use a trapezoidal wave form of the induced voltage, the zero voltage intervals being then of a duration equal to that of the constant voltage intervals. By composing two such alternating voltages mutually displaced ninety degrees in phase, a constant continuous voltage may be obtained. There are no difficulties in designing the magnetic circuit of a machine in such a manner that at no load the wave forms in question will have nearly the desired form. In synchronous generators and motors respectively, of the heteropolar type there will, however, arise difficulties in trying to maintain the desired wave forms under load. These difficulties are due to the deformation of the wave form of the induced voltage caused by the magnetomotive force exerted by the armature winding when the machine is loaded. Furthermore, ohmic and inductive voltage drops may cause a certain difference between the wave form of the induced voltage and that of the terminal voltage of the machine.

If considerable inductances, such as transformers and other alternating current windings, are included in the circuits the alternating current will further contain a component considerably displaced in phase in relation to the alternating voltage. As the commutators must shift the circuits to be commutated during the zero voltage intervals, it is obviously a condition for a correct commutation that there is a phase coincidence between voltage and current. Accordingly, a relatively small displacement in phase may imperil the commutation.

The invention has for its object to avoid these objections and to render possible a satisfactory commutation under fluctuating loads, with high voltages as well as with heavy currents. The invention consists substantially in that two or more alternating current circuits, on the one hand, are each supervised by one of the armature windings of an alternating current machine having main magnet poles and intermediate auxiliary poles, and, on the other, each cooperate with one commutator in such a manner that the currents in the alternating current circuits are commutated and the alternating voltages, impressed upon the commutators, are rectified which latter voltages through series-connection of the commutators are superposed to a substantially constant direct voltage.

If the direct current delivered from or impressed upon the main commutator, that is, the line direct current, has a too high voltage or amperage, and thus may not advantageously be used for feeding certain of the auxiliary windings proportionately to the load, a special auxiliary commutator may be provided according to the invention, the alternating current leads of which are associated with the high tension or low tension sides of a number of transformers, the opposite sides of which are connected with the main commutator. By properly selecting the ratio of transformation of the transformers, it will be possible to supply to the auxiliary commutator an alternating current of suitable amperage which, upon rectification, is supplied to the auxiliary windings. The direct current energy derived from the auxiliary commutator may then correspond to either the total energy passing through the main commutators or only a small fraction thereof. In the former case it is a question of a conversion of direct current to direct current of another voltage and, in the latter case, of a direct current generator or motor, the auxiliary direct current being adapted for auxiliary purposes only. For instance, in the case of a synchronous generator feeding a high tension main commutator through the intermedium of transformers, and in which the phase windings carry an alternating current of an amperage which, upon rectification, is suitable for the auxiliary windings, it is possible to provide auxiliary commutators in two or more of the generator phase windings on the low tension side of the transformers from which commutators the auxiliary windings will be fed. In case the phase windings of the generator have to deliver the no-load current of the transformers, particularly their excitation component, an undesirable component disadvantageous to the commutation will occur in said auxiliary commutators. According to the invention this disadvantage may be eliminated by providing special machines (excitation generators or separating generators) adapted to relieve the commutators of current components of this kind.

In the following the invention will be more particularly described, reference being made to the annexed drawings and further features of the invention being set forth.

Figure 2:
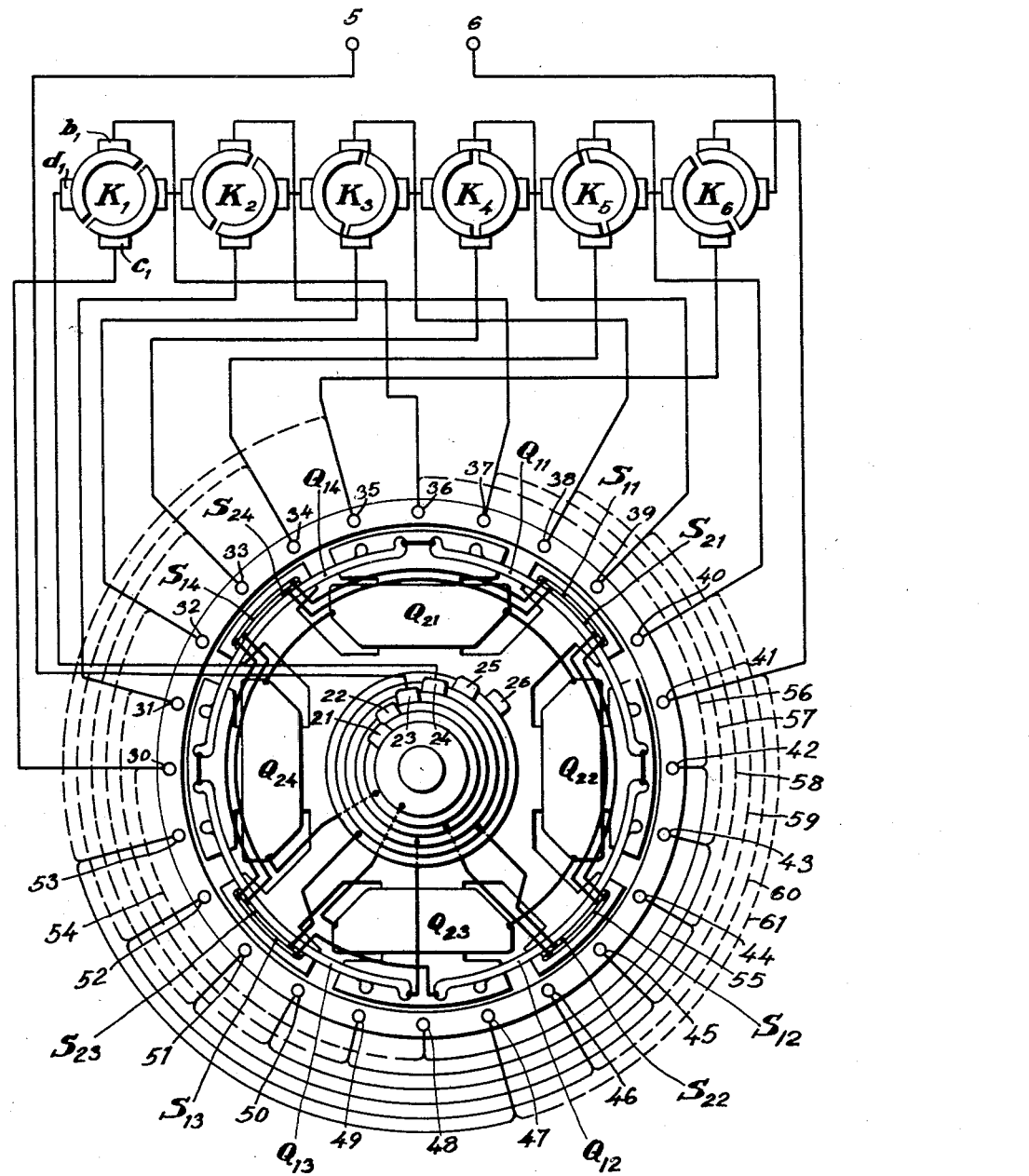
Figure 3:
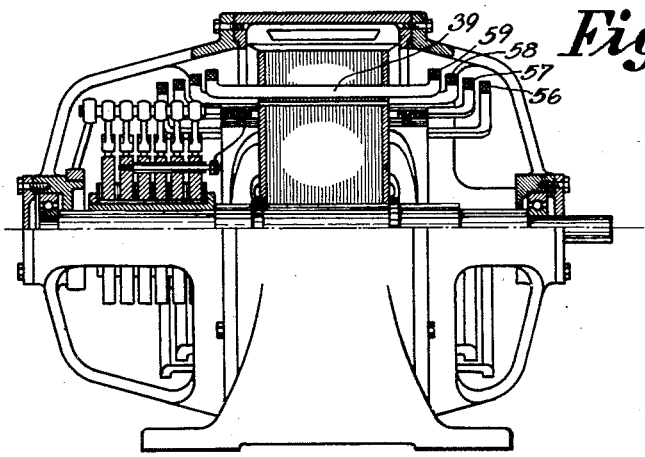
Figure 4:
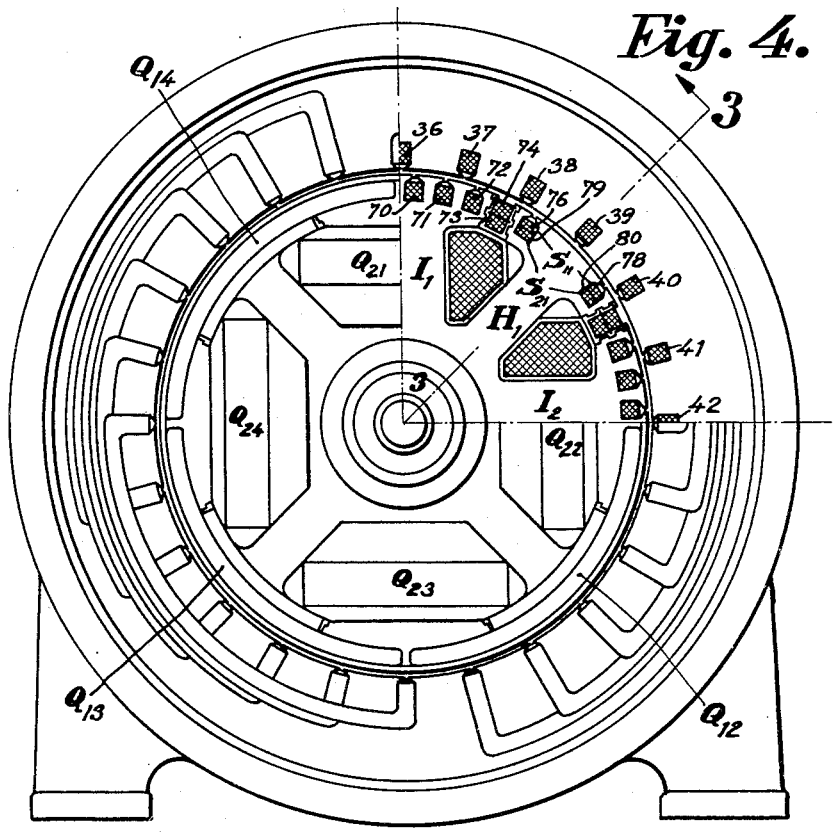
Figure 5:
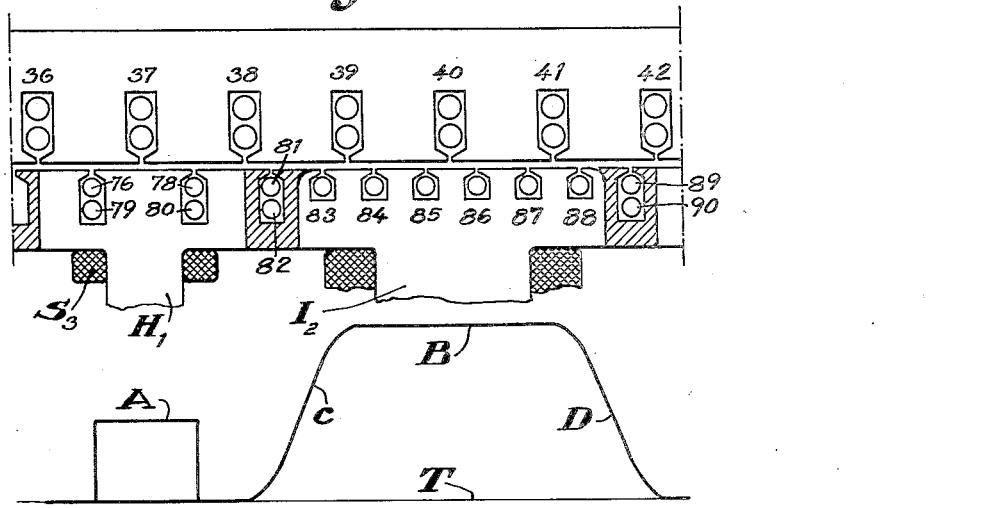
Figure 6:
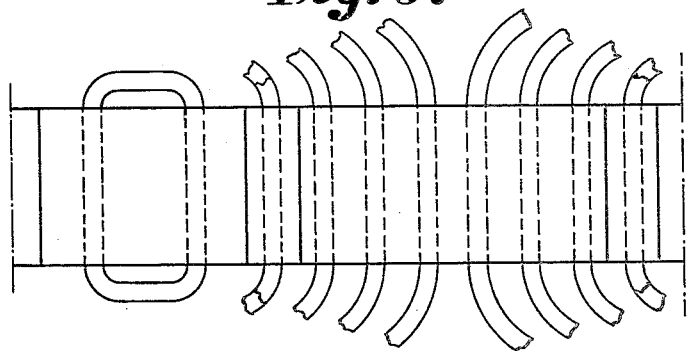
Figure 7:
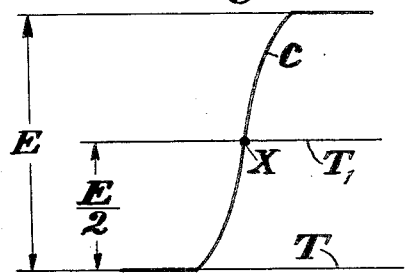
Figure 8:
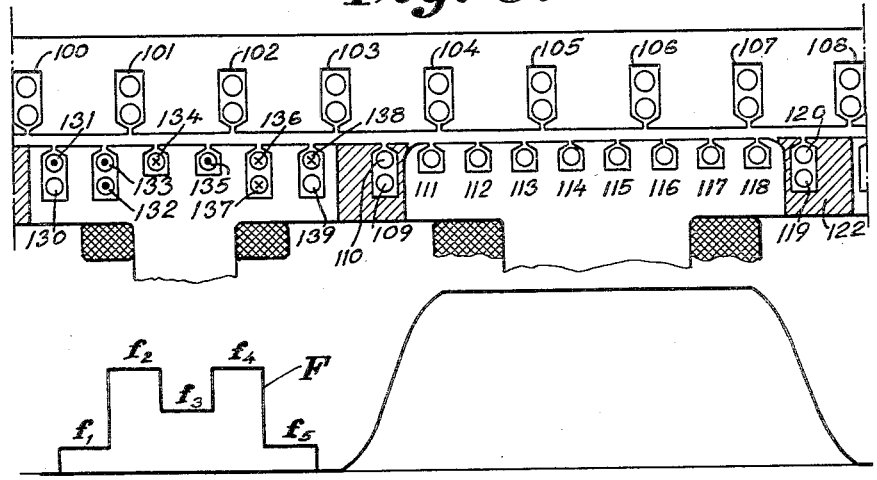
Figure 9:
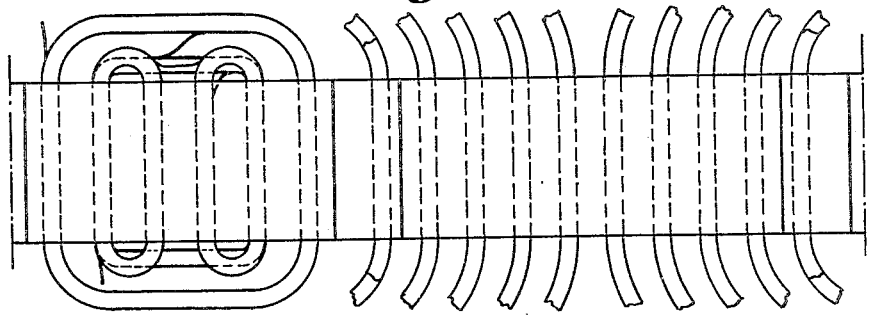
Figure 10:
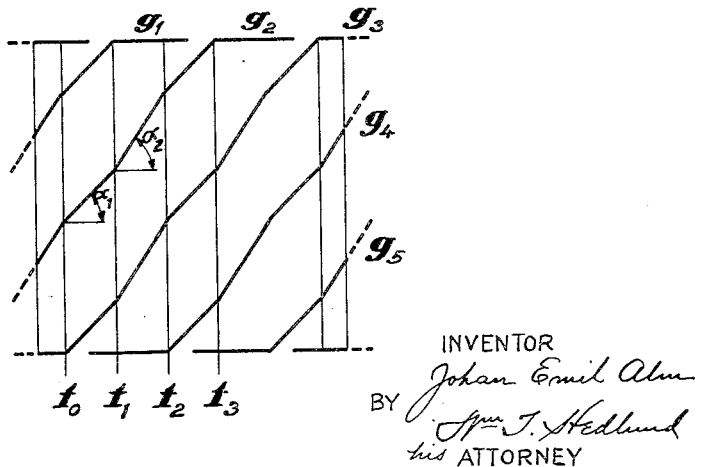
Figure 11:
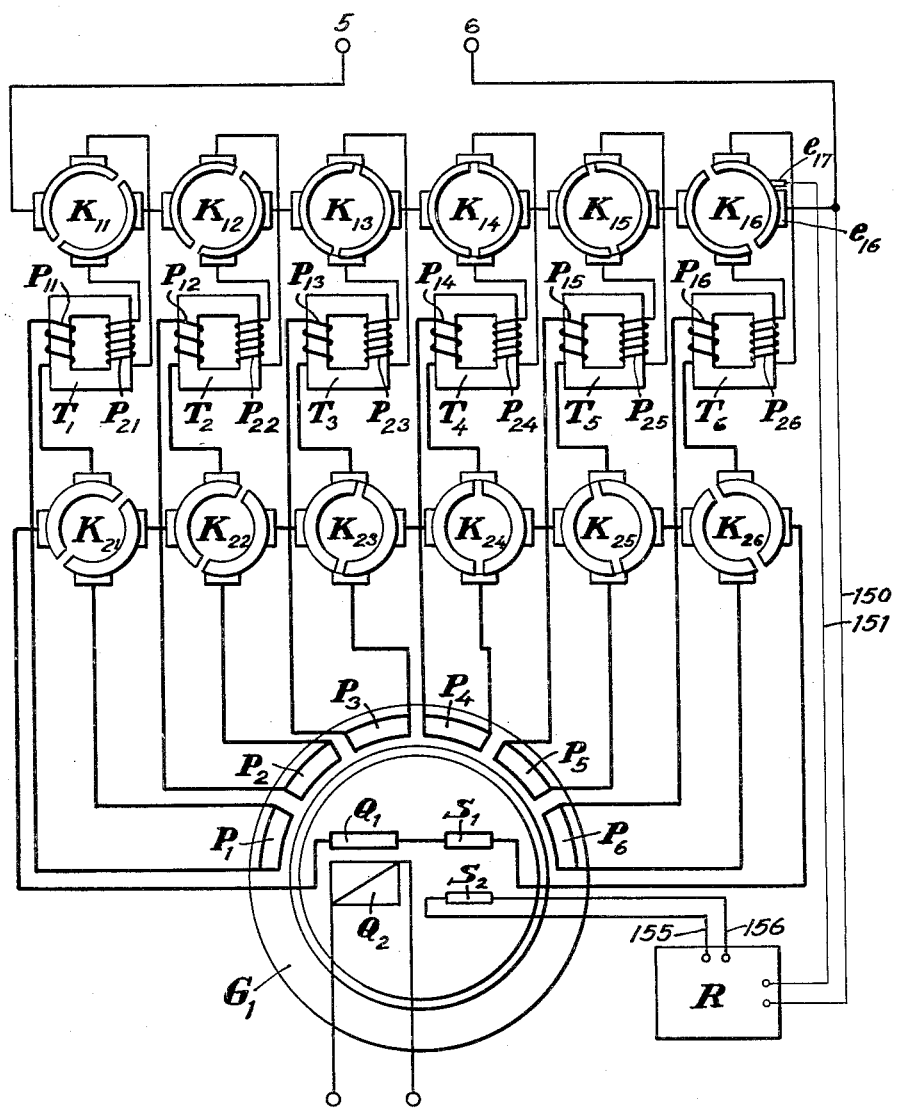
Figure 12:
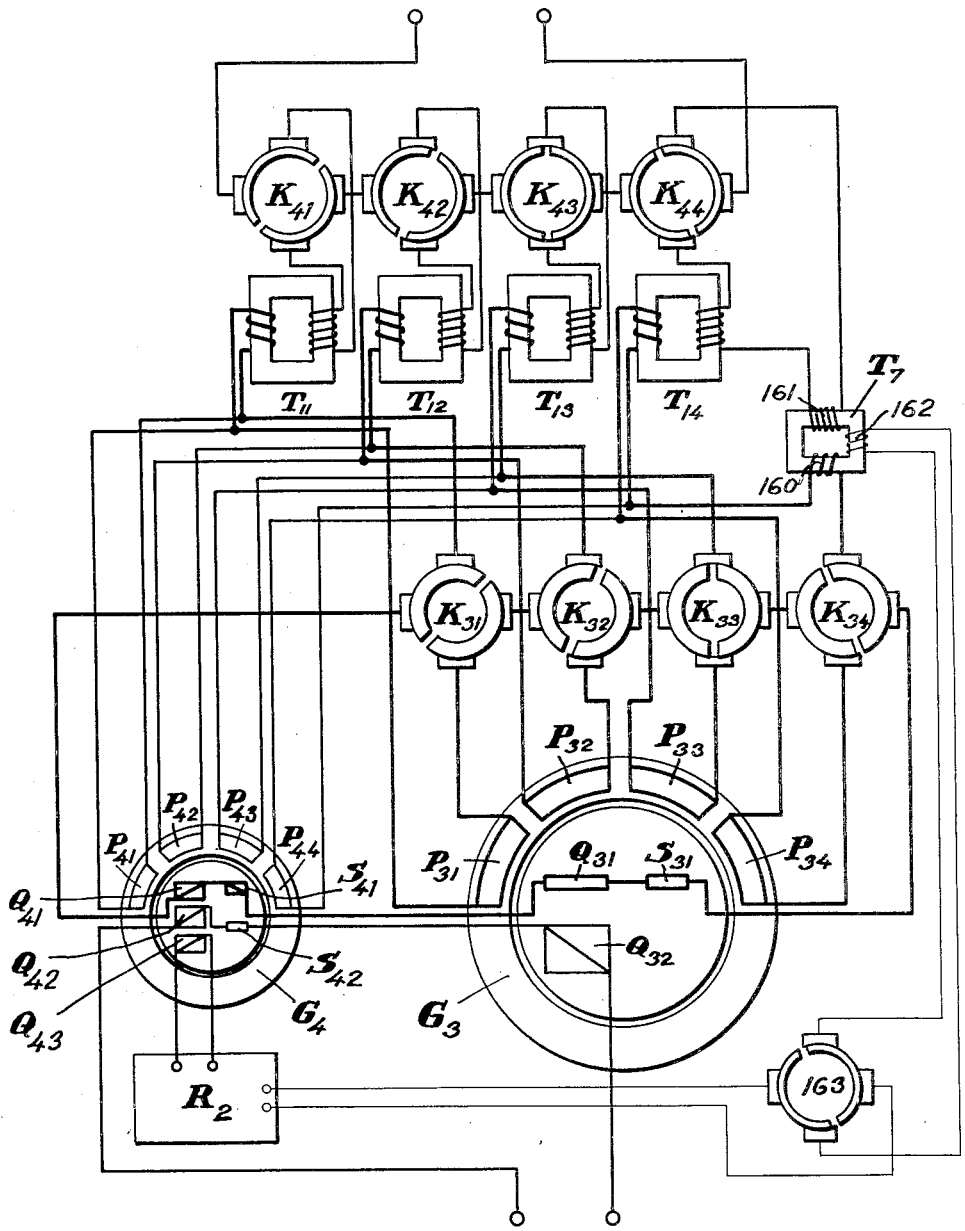
Figure 13:
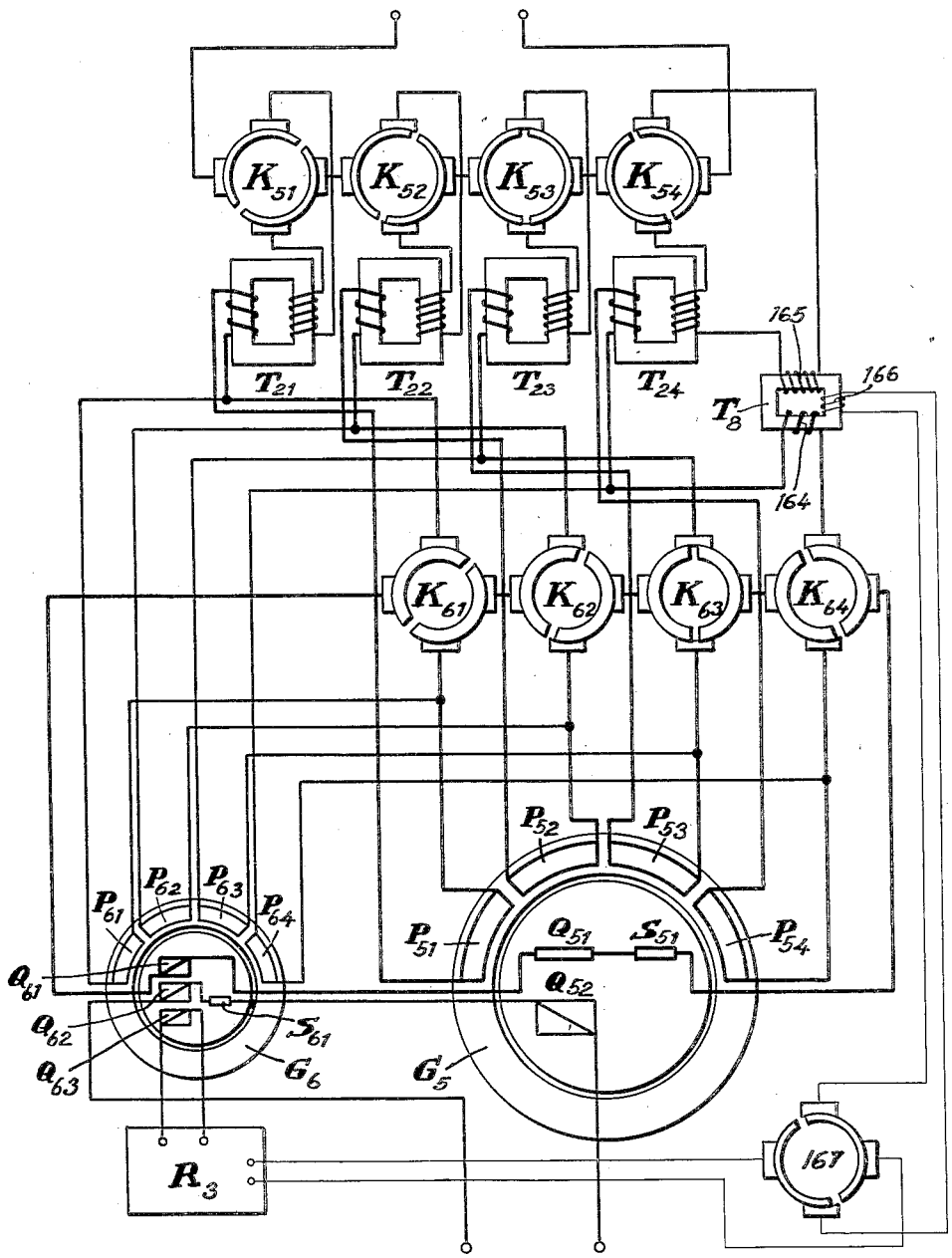
Figure 14:
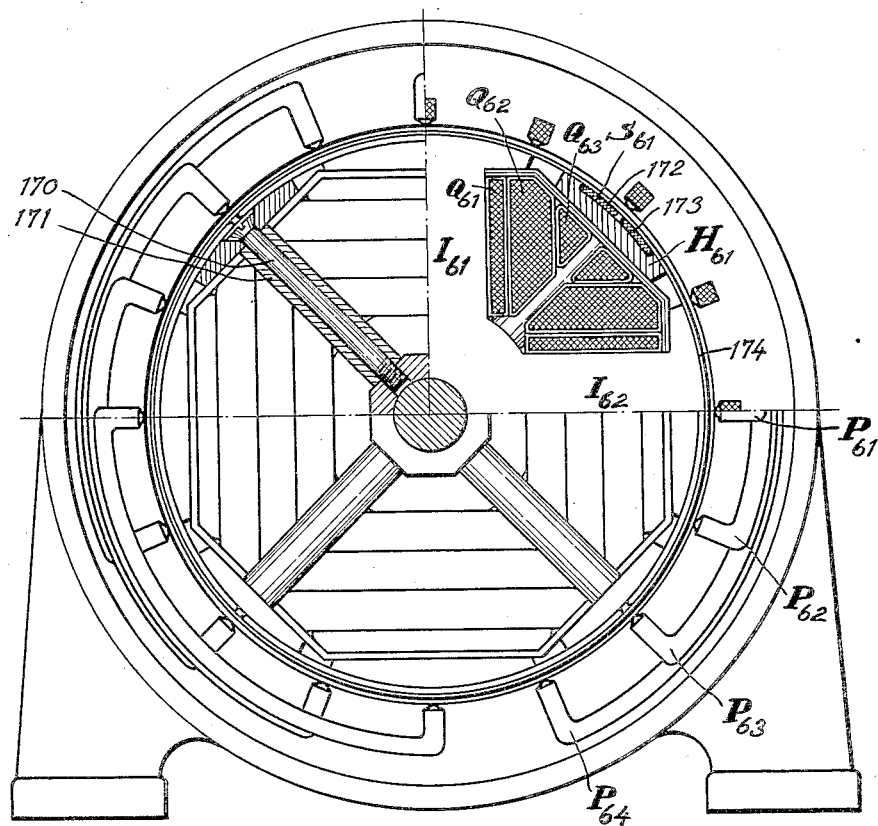
Figure 15:
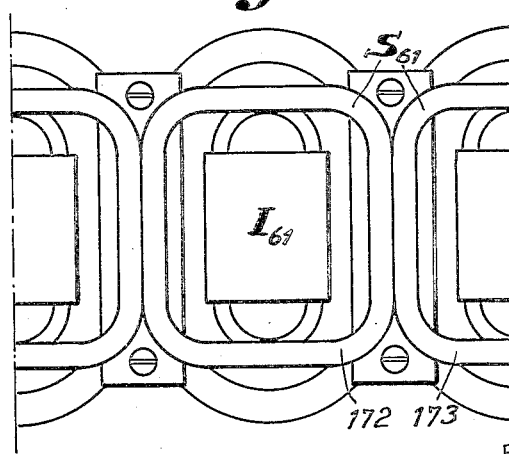
Figure 16:
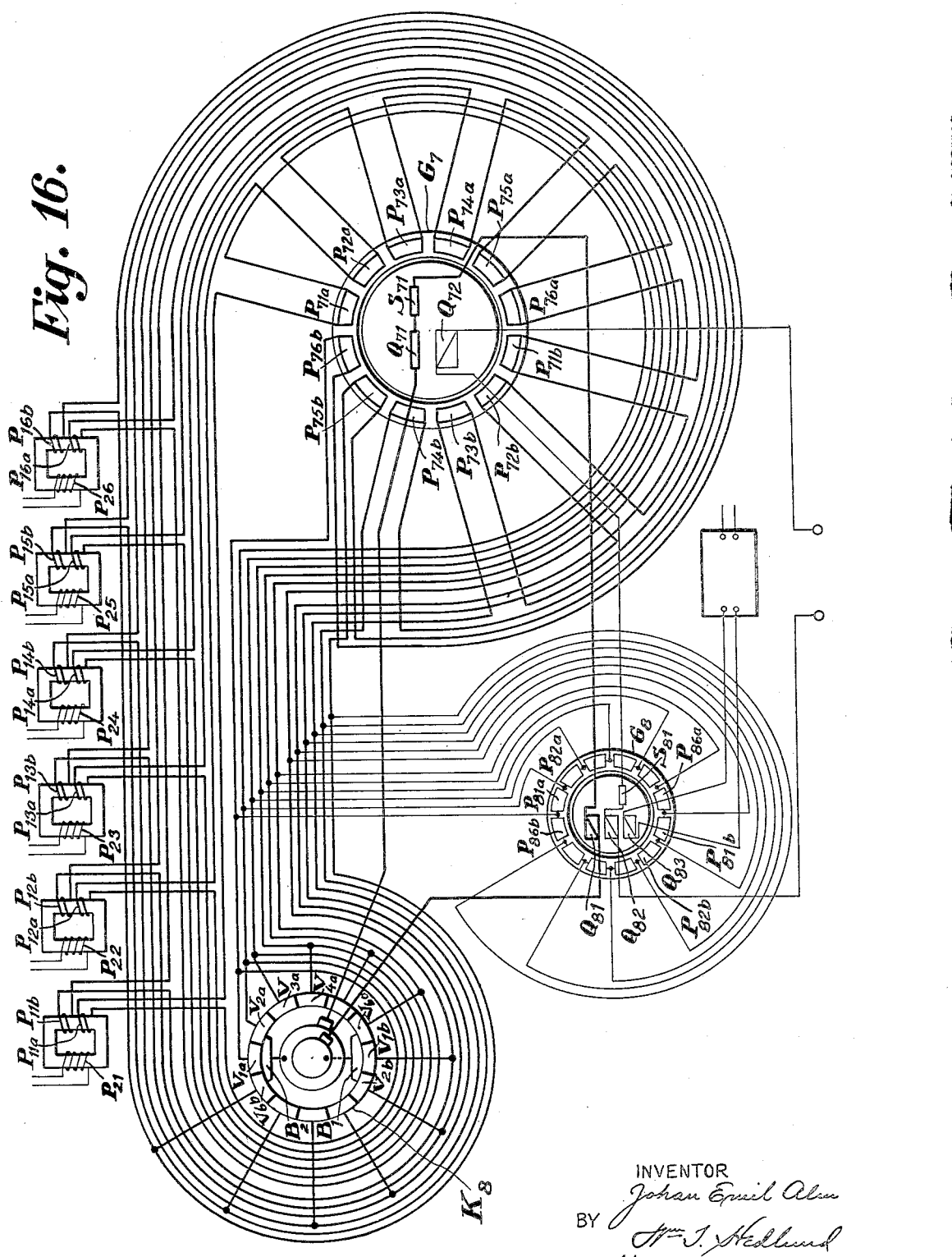
Figure 17:
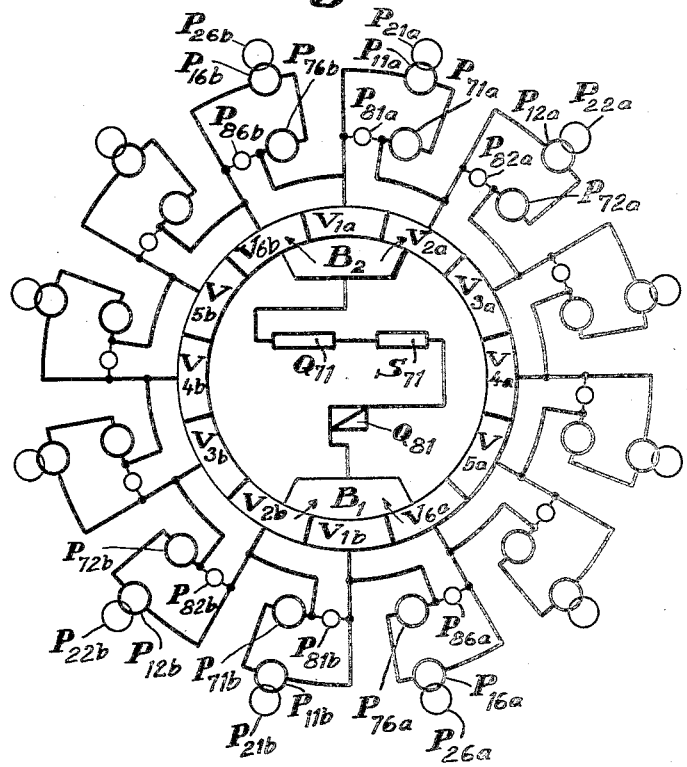
Figure 18:
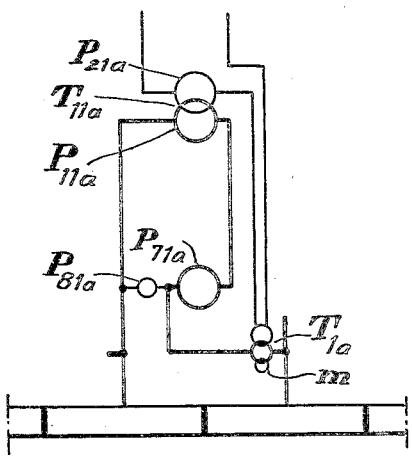
Figure 19:
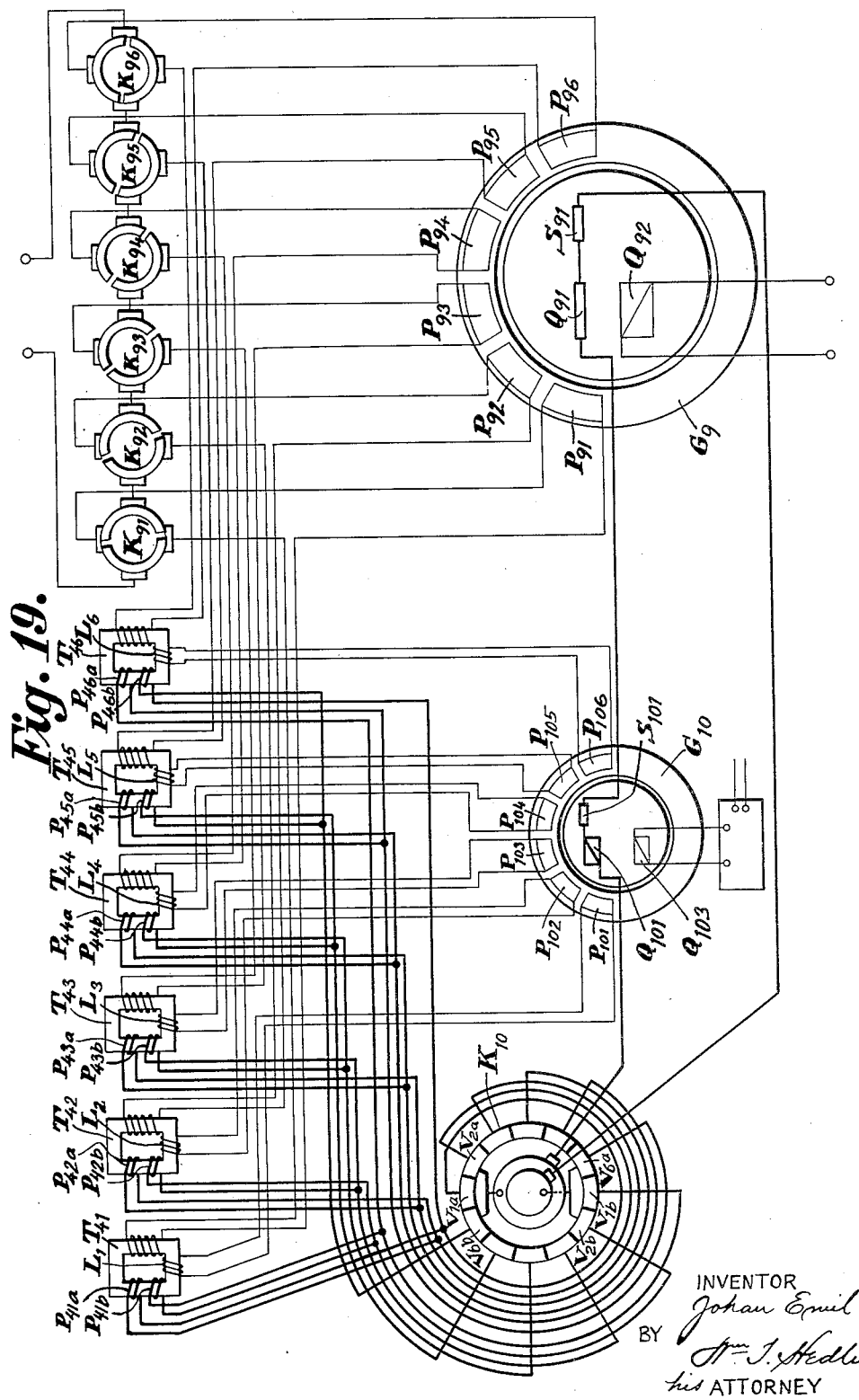
Figure 20:
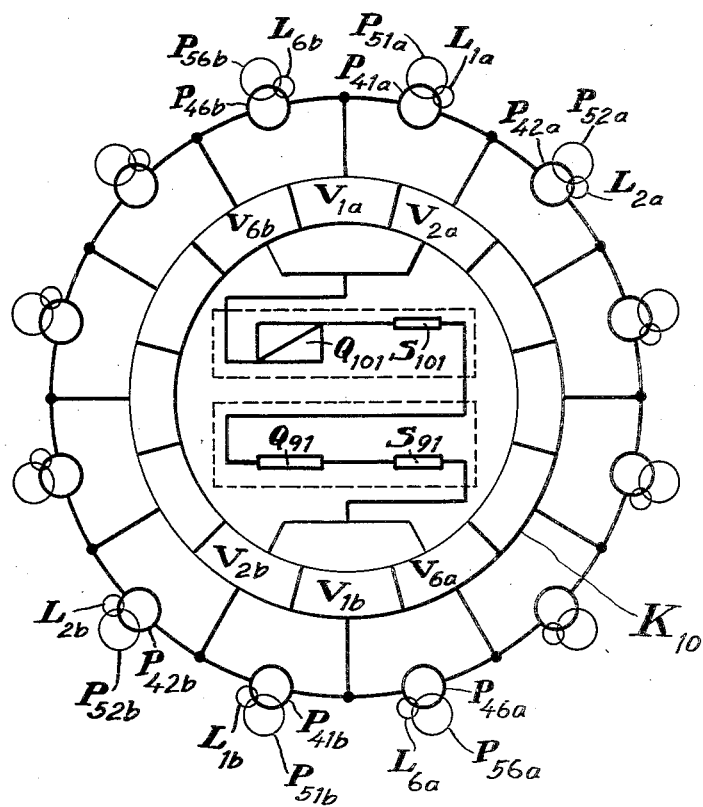

In the drawings Figure 1 shows a wiring diagram of a system according to the invention. Figure 2 is a more detailed diagram of the same embodiment. Figure 3 shows a machine of the system in side view and in longitudinal section taken on the line 3—3 of Figure 4. Figure 4 illustrates the machine viewed from its one end, on a somewhat enlarged scale, the end shield bearing bracket being removed. Figures 5 and 6 show diagrammatically details of the armature and auxiliary windings. Figure 7 is a diagram illustrating the variation of the field at one pole tip. Figures 8, 9, and 10 show in a similar way a modified embodiment of the windings and the corresponding commutation diagrams. Figure 11 shows diagrammatically an embodiment of the invention, having transformers and double groups of commutators without special auxiliary means for supplying the no-load current. Figure 12 illustrates a wiring diagram for the same embodiment with an excitation generator for producing the excitation current of the transformers. Figure 13 shows another embodiment of the corresponding means with a so-called compensating generator for relieving the commutator of the excitation current component. Figures 14 and 15 show details of the compensating generator shown in Figure 13. Figure 16 is a modified embodiment, while Figure 17 shows a simplified diagram of the system in Figure 16. Figure 18 is a detail of the system shown in Figure 17. Figures 19 and 20 illustrate in a similar way a modification of the embodiment shown in Figures 16 and 17.

In the arrangement shown in Figure 1 a synchronous generator or motor $G_1$ is provided with six phase windings $P_1$ to $P_6$. Each of these windings is connected to pairs of brushes $b_1$, $c_1$ to $b_6$, $c_6$, respectively, each pair of which bears against one commutator $K_1$ to $K_6$. These commutators each have two segments 7, 8 to 17, 18, respectively, which in the rotation of the commutator connect, for instance, the brushes $b_1$, $c_1$ alternately with the brushes $d_1$, $e_1$. Provided the commutator $K_1$ rotates half a revolution for each cycle of the alternating voltage and more particularly in such a manner that the brushes $b_1$, $c_1$ and $d_1$, $e_1$ short-circuit the two segments during the zero voltage intervals of the voltage induced in the winding $P_1$, the alternating voltage impressed upon the brushes $b_1$, $c_1$ is rectified to a continuous voltage between the brushes $d_1$, $e_1$. In the same manner the phase winding $P_2$ cooperates with the commutator $K_2$ et cetera. As is seen from the figure, the different commutators are mutually displaced corresponding to the different phase angles of the different armature windings. As the generated voltages constitute a six phase voltage system the phase windings $P_1$ to $P_6$ may be so arranged that voltages induced in two and two of the phase windings, such as $P_1$ and $P_4$, $P_2$ and $P_5$, and $P_3$ and $P_6$, are mutually displaced in phase ninety degrees. Then the appertaining commutators taken two and two, such as $K_1$ and $K_4$, $K_2$ and $K_5$, and $K_3$ and $K_6$, should be mutually displaced forty-five mechanical degrees. In the shown embodiment it is further assumed that the phase displacement between consecutive phases is thirty degrees, corresponding to a displacement of consecutive commutators of fifteen mechanical degrees. The structural design of such a machine will be more particularly described in the following.

On account of the considerable number of commutators which in the present case have to be provided side by side, the necessary axial space is of considerable importance. By providing, as indicated above, the communtators with a number of brushes twice that of the segments, only one contact path for each phase will be required. If the commutators are disposed on a shaft directly coupled to the machine the latter should be at least of the four pole type, that is, inducing four voltage and four no-voltage intervals for each revolution, as the commutator coupled thereto effects four commutations during each revolution.

The windings in this diagram (Figure 1) are, of course, only diagrammatically shown and in practice they are preferably evenly distributed on the periphery of the stator. In the diagram they are, however, shown in the manner indicated to illustrate the mutual phase displacement between different windings on the assumption that the machine in question is of the two pole type. In the following the nature of the windings will be more particularly described with reference to Figure 2.

On the drawings the rotor 19, Figure 1, is provided with ordinary magnet poles not shown on the drawings, and intermediate auxiliary poles. In the diagram, the windings appertaining to one magnet pole and one auxiliary pole are shown. On the magnet poles there are accordingly provided an ordinary excitation winding $Q_2$ fed with current in suitable manner from a current source indicated by 1, 2. The pole shoes are so shaped and the windings $Q_2$ so energized that the machine at no load has a voltage of desired wave form and amplitude. At no load the auxiliary poles preferably do not induce any electromotive force.

The voltage wave form is influenced at no load by the straying of the induction flux in the pole spaces. If there were only main poles it would not be possible to establish a zero voltage zone of desired duration. For this purpose a shielding of the magnetic lines of force is necessary and the above mentioned auxiliary poles at no load operate as shielding poles. Under load the influence of the so called armature reaction appears, that is, the magnetomotive force caused by the armature winding, which must be compensated by means of the above auxiliary windings and by means of short-circuited damping or attenuation windings of different kinds. At the same time the shielding poles may operate as commutation poles in accordance with the described embodiment.

The commutators $K_1$ to $K_6$ are series-connected on their direct current sides whereby the voltage impulses rectified by the different commutators are superposed or added to give a substantially constant continuous voltage, which will prevail between the terminals 5, 6. In this direct current circuit between the brush $d_1$ and the point 5 that portion of the auxiliary windings is included which requires an excitation proportional to the load. Said windings consist of a winding $Q_1$ disposed in slots of the main poles and a winding $S_1$ series-connected therewith and disposed in slots on the auxiliary poles. Further, a so called adjusting winding $S_2$ may be inserted in the slots of the auxiliary poles, the feeding of which winding may be adjusted manually or automatically from a suitable current source 3, 4. Of said windings the winding $Q_2$ has a magnetic axis coinciding with the centre of the appertaining main pole whereas the magnetic axis of the windings $Q_1$, $S_1$, and $S_2$ coincides with the centre of the appertaining auxiliary pole.

At no load the system operates in such a manner that all the rectified voltages are added or superposed to give a continuous voltage which, with a correct shaping of the poles, will be practically constant. As soon as the machine is loaded, however, current will flow through the armature conductors in the stator 20. Said windings cause a certain magnetomotive force which deforms the induction flux more or less and thus the wave form of the induced voltage. The winding $Q_1$ is so dimensioned that, upon the direct current flowing through it, a magnetomotive force of a direction opposite to that of the armature winding is caused whereby the deformation of the induction curve opposite the main pole is counteracted or eliminated. As soon as the machine is loaded and accordingly alternating current passes through the different phase windings, commutation difficulties arise in revising the current for the reason that the current, on account of the inductance of the coil short-circuited for the time being, does not reverse voluntarily. The windings $S_1$ disposed on the auxiliary poles have therefore for their purpose to induce a suitable auxiliary or commutation voltage in the short-circuited coil of such a direction, amplitude, and duration that the current is brought to reverse and reach its correct amplitude in the new direction at the end of the commutation period. The object of the adjusting winding $S_2$ will be explained in the following.

In the above it has been assumed that the machine operates as a direct current generator although it also, of course, may operate as a direct current motor. In the latter case the currents of the armature winding will have opposite directions whereby the magnetomotive force of the armature winding is reversed but is also in its new direction counteracted by the compensation winding $Q_1$ through which flows current in the opposite direction. Similar conditions relate to the commutation winding $S_1$.

Figure 2 shows diagrammatically but more in detail the disposition of the different windings in a four pole machine. The excitation windings $Q_2$ of the main poles are here designated $Q_{21}$ to $Q_{24}$. Correspondingly the compensation windings $Q_1$ of said poles are here denoted $Q_{11}$ to $Q_{14}$, while the commutation windings $S_1$ of the auxiliary poles are here marked $S_{11}$ to $S_{14}$ and the adjusting windings $S_2$ are marked $S_{21}$ to $S_{24}$. By means of slip rings the windings $Q_{21}$ to $Q_{24}$ are connected with the brushes 21 and 22. The windings $Q_{11}$ to $Q_{14}$ and $S_{11}$ to $S_{14}$ are mutually series-connected and through slip rings associated with the brushes 23, 24, which, in turn, are included in the continuous current circuit of the machine between the brush $d_1$ and the terminals 5. Through slip rings and brushes 25, 26 the windings $S_{21}$ to $S_{24}$ are connected to a direct current source not shown, such as the terminals 3, 4 in Figure 1.

According to the Figure 2, the armature winding is disposed as a so-called concentric winding having one conductor or coil respectively per slot and pole pitch. Thus the brush $c_1$ is connected to the conductor in the slot 39 and, through the connection 54 on the rear side of the machine, to the conductor in the slot 48. From this conductor the connection continues through the lead 55 to the conductor in the slot 42. Further, the connection continues through the lead 56 on the rear side of the machine to the conductor in the slot 36, which is connected to the brush $b_1$. This coil thus includes conductors in the four slots 39, 36, 42, and 48, which are mutually displaced ninety mechanical degrees or 180 electrical degrees, the electromotive forces induced in the different slots being added through the series-connection. In a similar way the brushes $b_4$ and $c_4$ of the commutator $K_4$ are connected to the conductors in the slots 38, 45, 51, and 33. These slots are all displaced forty-five mechanical and consequently ninety electrical degrees in relation to the slots containing the windings of the first phase. The remaining phases are similarly connected and arranged and further explanation thereof is not considered necessary.

As will be seen in Figure 2, in a winding system of this kind not less than six coil connections have to pass mutually in parallel on the same side of the machine in certain places, for example, between the slots 47 and 48. An embodiment of a machine of this kind is shown in Figures 3 and 4. According to Figure 3, the different coils have different conductor lengths because of which they are mutually unsymmetrical. In concentric windings of this kind it is therefore unavoidable that the different phase windings show different inductances and resistances which generally is not desirable. It is, therefore, more convenient to provide the machine with an armature winding of the so-called barrel winding type according to principles well known in the art, whereby all the phase windings will be mutually equal. On the drawings, however, the concentric winding type has been illustrated for the sake of clearness.

According to Figure 4 the windings $Q_{21}$ to $Q_{24}$ are disposed as ordinary excitation windings surround the poles cores $I_1$, $I_2$ et cetera, whereas the commutation windings $Q_{11}$ to $Q_{14}$ are slot windings of a nature more particularly described in the following and comprise, according to the embodiment illustrated, five groups of conductors in each half of the pole shoe. Of these conductor groups there are three, namely, 70, 71, 72, 73 and 74 outside the same in the intermediate space between the main pole and the auxiliary pole. The magnetic axis of the winding coincides with the centre of the auxiliary pole $H_1$.

According to the example shown, the windings of the auxiliary pole both consist of slot windings provided close to the edges of the pole shoe of the auxiliary pole $H_1$. The winding $S_{11}$ comprises the two conductor groups 76 and 78, whereas the winding $S_{21}$ comprises the windings 79 and 80.

Also in this case the magnetic axis of the windings coincides with the centre of the auxiliary pole $H_1$.

In Figures 5 and 6 the principal disposition of the windings is illustrated in an expanded diagram. The embodiment shown in these two figures differs from the above embodiments in that the slot winding of the stator is provided with two coil groups or conductors per slot. This will facilitate the provision of a barrel winding and in this connection a symmetrical disposition of the different phase windings. Further, according to Figure 5, an additional adjusting winding $S_3$ hitherto not mentioned is provided on the core of the auxiliary pole $H_1$.

In Figures 1 and 2 it has been presupposed that the width of the commutator brushes is so selected in relation to the segment pitch that continuously two commutators, and hence also two phase windings, are simultaneously short-circuited. For the sake of simplicity it has, however, been assumed in Figure 5 that only one of the phase windings is short-circuited at a time. It is generally a desideratum to obtain a so called rectilinear commutation, that is, the curve indicating the relation between amperage and time in the short-circuited coil should consist of a substantially straight line connecting the amplitude of the current prior to commutation with the amplitude of the current of opposite direction after commutation. This object may generally be obtained through the rectangular wave form A of the commutation flux shown in Figure 5. As one of the coils is at all times undergoing commutation, the variation per time unit in the commutating current volume in armature conductors opposite the commutation poles will be constant for a rectilinear commutation, for which reason also the required commutation voltage will be constant if the influence of ohmic resistances in the commutating circuit is neglected. By current volume is understood the instantaneous product of the amperage and the number of commutating armature conductors per cm. peripheral length. As seen from Figure 5, the extreme ends of the commutation flux A are very nearly directly opposite the two conductors 76, 78. The compensation winding should be so dimensioned that the air gap induction under the portions of the commutation pole outside the windings 76, 78 is practically equal to zero, in which case the auxiliary pole in those portions only operates as a shielding pole. If this is not obtainable with a sufficient degree of accuracy the desired result may be obtained with the aid of the additional adjustment winding $S_3$, the magnetomotive force of which counteracts any remaining flux.

Generally the magnet field of the main pole has a trapezoidal form B at no load. Practical tests have also shown that with a careful adjustment of the auxiliary windings the same result may be obtained at full load. The transitional curve portions C and D between the constant amplitude intervals and the zero intervals should have the form indicated in Figure 7.

Designating the maximum amplitude of the voltage by E, the curve C should be symmetrical about a line $T_1$ parallel with the axis T at a distance $$\frac{E}{2}$$

from the latter. The field curve intersects the axis $T_1$ in a point X which should be positioned exactly half way between the centre lines of the main pole and the auxiliary pole. Further, the curve C should be symmetrical about a vertical axis drawn through the point X.

According to Figure 5, the compensation winding comprises six conductors 83 to 88 disposed in the pole shoe proper and two pairs of conductors 81, 82 and 89, 90 outside the edges of the pole shoe. The said winding consists consequently of ten conductors or conductor groups in all. By these means it is possible to neutralize the magnetomotive force caused by ten armature conductors in, for instance, the five slots 38 to 42. At the same time there are two conductors in the slot 37 in which commutation proceeds at the instant in question.

It has above been assumed that either two or one of the coils simultaneously are short-circuited. On the other hand, if the number of simultaneously commutating coils during the rotation of the machine fluctuates between, for instance, two and three, and thus on an average is constituted by a fractional number, the conditions will be more complicated. In Figures 8 to 10 the conditions in a machine having eight armature phases are illustrated in which the armature winding is disposed in eight slots, such as 101 to 108, in each pole pitch. In this case it is assumed that the compensation winding of the main pole comprises twelve conductors 109 to 120 of which two conductor pairs 109, 110 and 119, 120 are disposed outside the pole shoe proper in a non-magnetic intermediate piece 121, 122. This piece may simultaneously serve as a holding member. The conductors in the pole shoe are thus adequate to compensate the armature reaction caused by the conductors in the six slots 103 to 108.

In order to obtain so favourable commutation conditions as possible the commutating current volume should preferably always be constant. For this purpose the commutation may proceed at a slower rate when three conductors or conductor groups commutate simultaneously and more rapidly when only two conductors or conductor groups commutate at the same time.

In Figure 10 is shown how the commutation proceeds in five consecutive coils $g_1$ to $g_5$. During the interval $t_0$ to $t_1$ commutation takes place simultaneously in the three coils $g_1$, $g_2$, and $g_3$, the commutation pole then enforcing a current reversal, the rapidity of which is indicated by the inclination angle $\alpha_1$. During the following intervals $t_1$ to $t_2$ the commutation proceeds only in the two coils $g_2$ and $g_3$ at about fifty percent increased rapidity in conformity with the inclination angle $\alpha_2$. In the next instant $t_2$ to $t_3$ three coils commutate simultaneously, for which reason the commutation now again proceeds more slowly, et cetera. Hence a commutation curve is obtained in the form of a slightly broken line which, however, does not deviate to any appreciable degree from a straight line.

The wave form of the commutation flux required to enforce commutation according to Figure 10 is indicated by F in Figure 8. This field curve comprises two comparatively low amplitude portions $f_1$, $f_5$, two portions of a comparatively high amplitude $f_2$, $f_4$, and a portion of average amplitude $f_3$. Provided the insignificant disturbances from the slots are neglected such a field may be caused, for instance, by two conductors 131, 138 passed by current of opposite directions and together causing a magnetomotive force, the amplitude of which corresponds to the portions $f_1$, $f_5$. Further a coil containing the conductors 132, 137 is provided which increases the magnetomotive force to a value corresponding to the portion $f_3$. Further two coils 133, 134 and 135, 136 are provided, the relative current directions of which is seen in the figure, a cross designated, for instance, a current directed from the observer whereas a point designates a current directed towards the observer. In this manner two limited fields are further caused which correspond to the high portions $f_2$, $f_4$ of the magnetomotive force. With such a wave form of the magnetomotive force it is possible to obtain a commutation according to Figure 10.

As the conditions become considerably more complicated in this case the machine should preferably be so designed that the same number of coils always commutate simultaneously, by way of example, in accordance with the conditions relating to Figures 5 and 6.

Whereas according to Figure 1 it has been presumed that the alternating voltage delivered by the synchronous generator or supplied to the synchronous motor respectively, upon being rectified, corresponds directly to the direct current requirements, it is assumed in Figure 11 that it is necessary to include transformers between the synchronous machine and the commutators associated with the direct current terminals 5 and 6. This may be the case if the amplitude of the continuous voltage and/or amperage is so high as to render the dimensioning of the synchronous machine inconvenient or difficult. But it may also be desirable to employ transformers in other cases. It has thus, according to Figure 1, been assumed that the main direct current is suitable for feeding the compensation windings of the rotor. Where very high continuous voltage or current amplitudes are concerned, this might involve considerable disadvantages which, however, may be avoided by means of the embodiment of the invention diagrammatically shown in Figure 11.

The characters $G_1$, $P_1$ to $P_6$, $Q_1$ and $Q_2$, and $S_1$ and $S_2$ in Figure 11 designate the same parts as in Figure 1. Furthermore $K_{11}$ to $K_{16}$ are commutators provided next to the terminals 5 and 6 and for the sake of simplicity termed main commutators in accordance with the above. This embodiment comprises furthermore an additional group of commutators $K_{21}$ to $K_{26}$ which will be termed auxiliary commutators. Between those groups of commutators a number of transformers $T_1$ to $T_6$ are disposed and provided with primary and secondary windings. For the sake of simplicity it is presupposed in the following that the synchronous machine $G_1$ operates as a generator in which case the windings $P_{11}$ to $P_{16}$ are to be considered as primary windings, and the windings $P_{21}$ to $P_{26}$ as secondary windings. Provided the machine is so adjusted that the commutators $K_{11}$ to $K_{16}$ rectify the alternating voltages correctly into a constant continuous voltage between the terminals 5 and 6, and assuming that the transformers are ideal, that is, that their excitation current and other no-load components are equal to zero, obviously the commutators $K_{21}$ to $K_{26}$ will commutate properly and deliver a primary direct current of a strength equal to the secondary direct current reduced to the primary side. According to Figure 11 the rectified primary current is used for feeding the compensation windings $Q_1$ and $S_1$ with current. In order to control the commutation in the commutators $K_{11}$ to $K_{16}$, the brush $e_{16}$ is provided with an auxiliary brush $e_{17}$, from which two conductors 150 and 151 extend to a relay R, the object of which is to supply the adjusting winding $S_2$ with direct current of such a direction and amperage that proper commutation is obtained or re-established. A circuit arrangement of this kind is previously described in the French Patent 723,082. Moreover, other kinds of relays, for instance electromechanical relays may be used, provided they are adapted to be operated differently at different directions of the deviation impulse.

It is also possible to connect the terminals 5 and 6 to the commutators $K_{21}$ to $K_{26}$, and to connect the compensation windings $Q_1$, $S_1$ to the commutators $K_{11}$ to $K_{16}$. This will be convenient in cases where the generator delivers a comparatively high alternating voltage which need not be transformed into higher voltage, and a rather small amperage, for instance, of the order of a few amperes whereas a considerably higher direct current amperage of moderate voltage is desirable in the compensation windings. In such a case the transformers may be considered as current transformers on account of their being designed only for a voltage corresponding to the drop in voltage in the windings $Q_1$ and $S_1$. This is in contradistinction to the former case, in which the transformer windings must be designed for the full current and full phase voltage. It should be noted that the transformers are included in the alternating current circuits of the commutators and accordingly are passed by pure alternating current having approximately trapezoidal half waves. The secondary voltages are of the kind already described having trapezoidal half waves and intermediate zero voltage intervals.

In the foregoing it has been presumed that the transformers are ideal. This, however, is never the case in practice, as additional effect for the excitation of the transformer cores must be supplied. So far as ordinary transformers are concerned this excitation or no-load effect appears as a current component superposed upon the primary load current and considerably displaced in phase in relation thereto. Said component has to induce in the transformer windings an electromotive force of trapezoidal wave form with intervening zero voltage intervals by a suitable excitation of the transformer cores and will obstruct the commutation to a high degree as its value during the zero voltage intervals, when the load current is to be commutated, must differ from zero and be nearly constant. In case commutators are provided in the primary or secondary transformer windings, it will therefore be necessary to make special provisions to relieve the commutators of said components. In practice, this may be brought about in different manners. In Figure 12 an embodiment of an excitation generator is illustrated for eliminating the no-load components in the commutators. The system comprises a generator or motor $G_3$ having, for instance, four phase windings $P_{31}$ to $P_{34}$ which are connected to the primary windings of a number of transformers $T_{11}$ to $T_{14}$. In these primary circuits four auxiliary commutators $K_{31}$ to $K_{34}$ are included which are intended to feed the compensation windings $Q_{31}$ and $S_{31}$ with direct current. On the secondary side of the transformers a number of main commutators $K_{41}$ to $K_{44}$ are provided as shown in the figure. To the primary windings of the transformers are shunted the four phase windings $P_{41}$ to $P_{44}$ of a special excitation generator $G_4$. The object of this generator is to supply at each instant the necessary excitation energy to the primary sides of the transformers. Of course, there is no objection against the excitation generator instead feeding special tertiary windings on the transformer cores or being connected to the secondary sides of the transformers. Obviously, it will not be difficult to so adjust or design the excitation generator that it delivers a voltage of the same wave form as and of an amplitude so much higher than that of the main generator that it will take over the excitation of the transformers, in which case the no-load component does not pass through the commutators $K_{31}$ to $K_{34}$. To obtain this result as nearly as possible one excitation generator should be provided with shielding poles and each pole arc, reckoned in electrical degrees should be substantially the same as in the main generator.

In order to explain the operation of the different windings of the main and auxiliary machines, it is initially assumed that the system is running at no-load. In this case the excitation winding $Q_{32}$ is to be so fed that the necessary "main voltage" is obtained. The expression "main voltage" means in this connection the phase voltage of the main generator. Due to the phase windings of the excitation generator $G_4$ being shunted across those of the main generator, the main poles of the former are to be excited by the winding $Q_{42}$ in such a manner that the voltage delivered by the phase windings of the generator $G_4$ at each instant is equal to that of the main generator. For this purpose it is convenient to connect the winding $Q_{42}$ in series with the winding $Q_{32}$. On the other hand, the excitation generator will be substantially under reactive load, as the excitation component of the transformers is displaced ninety degrees in phase in relation to the main voltage. In other words, in that instant, when the shielding poles of the excitation generator are passing opposite a certain coilside, the latter will carry current of maximum amplitude. The magnetomotive force of the armature winding is thus substantially counter-exciting, and this counter-exciting effect extends not only over the main poles but also over those parts of the shielding poles which fall within the pole pitch between the centre of a shielding pole to the centre of a consecutive shielding pole. It will consequently frequently be necessary to compensate the armature reaction of the excitation generator not only by means of a certain number of ampere-turns on the main poles but also by means of a special compensation winding $S_{42}$ provided in slots of the auxiliary poles. The amperage to be supplied to that winding depends upon the amperage of the excitation current of the transformers, which in turn is a function of the induced main voltage. The most simple manner to proceed is consequently to connect the compensation winding $S_{42}$ in series with the windings $Q_{32}$ and $Q_{42}$.

Upon loading the system, the conditions will change in the following manner. Due to the voltage drops in the main generator, the conductors, and the primary windings, the necessary main voltage, induced in the transformers, will be somewhat lower. Consequently, it will be necessary to reduce slightly the main voltage of the excitation generator. For this purpose, the main poles of the excitation generator are provided with a negative compound winding $Q_{41}$, which should be excited in proportion to the load, preferably by connecting same to the series circuit fed by the commutators $K_{31}$ to $K_{34}$. Furthermore, the commutation winding $S_{31}$ of the main generator will at increasing load only be sufficient to ensure the current reversal in the appertaining primary circuit. Consequently, the magnetic energy corresponding to the current reversal in the secondary winding should be inductively transmitted from the primary side, for which purpose it will be necessary to cause an alteration in the main flux. It must, however, then be observed, that at no-load the main flux should be constant during the commutation period, as then the main voltage is equal to zero. As the induction of the main flux in the iron core during this period is comparatively high and, consequently, its permeability low a considerable variation in the main flux and accordingly in its excitation current will be necessary at load during the short-circuit interval in order to transfer the magnetic energy necessary for the commutation in the secondary circuits. The most practical way to achieve this object consists in providing a series-connected excitation winding on the shielding poles of the excitation generator, whereby during the commutation interval an additional excitation component is caused, which is proportional to the load current and causes the necessary alteration in the main flux. For this purpose the auxiliary poles of the excitation generator $G_4$ are, according to the embodiment shown in the drawings, provided with a series-winding $S_{41}$, which is included in the series circuit of the commutators $K_{31}$ to $K_{34}$.

Another method, although not equally advantageous, consists in causing the necessary alteration by means of a part of the load component of the current.

After the load having continued for some time certain secondary disturbances will arise due to the heating of the conductors et cetera causing unbalance in the operation and eventually sparking in the commutators.

If, for instance, the voltage supplied by the excitation generator $G_4$ to the transformers $T_{11}$ to $T_{14}$ does not exactly correspond to the necessary excitation voltage, the machine $G_4$ will, depending upon its voltage being too high or too low, deliver or receive active current. This is to say, the machine will deliver or receive respectively a part of the load current and consequently the numbers of primary and secondary load ampere-turns of the transformers $T_{11}$ to $T_{14}$ no longer remain equal and opposite. This deviation from normal conditions may be employed for restoring the proper excitation in the following manner. The primary circuit of the transformer $T_{14}$ between the phase winding $P_{34}$ of the generator $G_3$ and the branch circuit to the phase winding $P_{44}$ of the generator $G_4$ is series-connected with a primary winding 160 of a differential transformer $T_7$, the secondary winding 161 of which is series-connected with the secondary winding of the transformer $T_{14}$. The ampere-turns of the winding 160 are related to that of the winding 161 in the same manner as the ampere-turns of the primary winding of the transformer $T_{14}$ are related to that of the secondary winding thereof. Normally the ampere-turns of the windings 160 and 161 counteract each other completely, whereas upon incorrect excitation voltage in the excitation generator $G_4$, a differential flux component will be caused in the core of the transformer $T_7$, which component produces an alternating voltage in a tertiary winding 162 provided on the iron core of the transformer. This alternating voltage may be rectified by means of a commutator 163, whereupon the rectified impulses are conducted to a relay $R_2$, the object of which is to amplify and rectify the differential impulses to obtain a continuous current of the necessary amperage. This latter current is passed to an additional excitation winding $Q_{43}$ on the main poles of the excitation generator. If the winding direction of the winding $Q_{43}$ and the amplification of the relay $R_2$ are properly selected, it will be possible to restore the excitation of the transformers $T_{11}$ to $T_{14}$ to its proper value. A circuit arrangement of similar nature is described in the French Patent 727,132, Figure 3. A relay of a design suitable for the purpose in question is described in the French Patent 723,082, but also other relay types may be used, such as electromechanical relays for instance of the polarized type, provided they are adapted to be actuated in different manners by direct current voltages of opposite signs. In order to amplify the effect of the arrangement, differential transformers may be provided in several phases and the rectified voltage impulses series-connected.

The above described embodiment of the auxiliary machine has, however, the disadvantage that the phase windings of the excitation generator are shunted to the primary windings of the transformers, for which reason said generator must be designed for the total excitation effect of the transformers. The total primary current in a transformer comprises both the load component corresponding to the secondary current, and the excitation current component of the transformer. According to the invention, the auxiliary machine in Figure 13 may be adapted to separate, so to speak, the excitation current component from the total primary current in a phase and to pass such component through a by-path across the commutator, whereas the active load component is forced to enter the auxiliary commutator to be rectified and supplied to the series-excited auxiliary windings. In such a separating generator provided with the same number of phases and the same wave form as the main generator, each phase is connected across the appertaining commutator. At no load, the separating generator receives a basic excitation of such a magnitude that the no-load currents of the transformers in spite of the voltage drop in the phase windings of the separating generator are forced to pass through said windings. Said current will then be by-passed through this winding and will not have any tendency to pass through the commutator. At load the excitation will be increased by means of a series winding on the magnets just enough to correspond to the drop in voltage of the load direct current in the auxiliary windings and their supply conductors. Thereby alternating currents of corresponding amperages are prevented from passing through the phase windings of the separating generator but are forced to pass the commutators and be rectified thereby, whereas the excitation component as above described will be by-passed through the phase windings of the separating generator. Thus the advantage is obtained that the auxiliary machine may be designed with considerably smaller dimensions than in the former case, viz. only for a voltage corresponding to the drop in voltage in the auxiliary windings and for a current equal to the excitation current of the transformers.

In Figure 13, $G_5$ designates a synchronous generator or motor comprising the windings $Q_{51}$ and $Q_{52}$ on the main poles and a winding $S_{51}$ on the auxiliary poles as well as phase windings $P_{51}$ to $P_{54}$. Moreover, the system comprises a number of transformers $T_{21}$ to $T_{24}$, the primary windings of which are connected to the phase windings $P_{51}$ to $P_{54}$ and the secondary windings of which are connected to a number of commutators $K_{51}$ to $K_{54}$. In similarity with the machine $G_4$ in Figure 12, the auxiliary machine or "compensating" generator $G_6$ comprises a compensation winding $S_{61}$ on the auxiliary poles and an excitation winding $Q_{62}$ on the main pole, connected in series with the former winding. Further, a series-energized winding $Q_{61}$ and an auxiliary winding $Q_{63}$ controlled by a relay $R_3$ are provided on the main poles. The current for the windings $Q_{61}$, $Q_{51}$ and $S_{51}$ is supplied by the auxiliary commutators $K_{61}$ to $K_{64}$. As indicated above each of the phase windings $P_{61}$ to $P_{64}$ of the auxiliary machine $G_6$ is connected in parallel to one of the commutators $K_{61}$ to $K_{64}$.

This embodiment differs from that illustrated in Figure 12 substantially in that the main generator $G_5$ in Figure 13 supplies the necessary excitation current for the transformers $T_{21}$ to $T_{24}$, which as a rule may be effected without any inconvenience as the excitation current only amounts to a few per cents of the normal load current of the machine. The total current through the primary windings of the transformers and the phase windings of the generator comprises load current as well as excitation current, and the latter component, being out of phase with the main voltage, passes also through the phase windings $P_{61}$ to $P_{64}$ of the auxiliary machine $G_6$. Only current exactly in phase with the voltage will thus enter the commutators $K_{61}$ to $K_{64}$ and be rectified thereby into direct current for feeding the series windings.

In this case the drop of voltage in the circuit $Q_{61}$, $Q_{51}$, $S_{51}$ will increase at increased load, for which reason the series winding $Q_{61}$ conveniently assists the winding $Q_{62}$. The winding $S_{61}$ also counteracts the armature reaction upon the shielding poles which has its maximum value during the commutation interval, that is, just at that instant when the auxiliary pole passes opposite a certain coil connected to a circuit to be commutated.

As will be understood from the above explanation of the operation of the separating generator, the object of the series winding $Q_{61}$ is to increase the voltage of the machine in the same degree as the load and, consequently, also as the drop in voltage in the auxiliary windings $Q_{61}$, $Q_{51}$, $S_{51}$. The object of the windings $Q_{62}$ and $S_{61}$ is to compensate for the drop in voltage caused by the no-load current in the phase winding $P_{61}$ to $P_{64}$ and the deforming influence upon the curve of induction caused by the magnetomotive force of said phase windings. The winding $Q_{63}$ represents an adjusting winding actuated by deviation impulses caused when the winding $Q_{61}$ for one reason or another does not exactly give the desired excitation.

For that purpose, the relay $R_3$, as described concerning the relay $R_2$ in Figure 12, is controlled by a differential transformer $T_3$, the primary winding 164 of which is included in the alternating current circuit of the commutator $K_{64}$ between the branch circuits to the phase winding $P_{64}$ of the generator $G_6$, and the secondary winding 165 of which is connected to the secondary side of the transformer $T_{24}$. The tertiary winding 166 is connected to the relay $R_3$ through a commutator 167.

It will be readily understood that the number of auxiliary commutators may be reduced for instance to only two, provided these two commutators together are adapted to compose a direct current. The unbalance caused hereby is without any practical importance but may, if desired, be equalized by special resistances included in the remaining phases.

The separating generator $G_6$, shown in Figure 13, may be designed, for instance, according to Figures 14 and 15. The embodiment shown in these figures is provided with four main poles $I_{61}$, $I_{62}$ et cetera and with four intermediate auxiliary poles $H_{61}$, et cetera. On the stator the different phase windings $P_{61}$ to $P_{64}$ are provided. According to this embodiment the auxiliary poles are plate-shaped and communicate with the main magnetic circuit through a number of screw bolts 170 which, if desired, may be provided with spacing tubes 171. The main poles are provided with windings $Q_{61}$, $Q_{62}$ and $Q_{63}$, the magnetic axis of which coincides with that of the main pole. The auxiliary poles are only provided with the windings $S_{61}$, consisting of flat conductors 172 and 173 the magnetic axis of which, according to Figure 15, coincides with the centre of the main poles $I_{61}$ et cetera. The conductors 172 and 173 are disposed in the air gap surface of the auxiliary pole $H_{61}$. The rotor itself is surrounded on its outer side by a metallic casing 174, preferably of copper, serving as a damping winding.

As will be seen from the figure, the shielding pole shoes $H_{61}$ serve simultaneously as holding members for the windings $Q_{61}$ to $Q_{63}$ on the main poles. The bolts 170 provide an easy mounting for the shielding poles after the windings have been placed on the main poles.

In the above the manner of deriving direct current necessary for the auxiliary windings from the primary or, alternatively, from the secondary side of voltage transformers has been set forth, the object of said transformers being to change the voltage of the generator or motor to suit the line voltage. Even if the machine $G_1$ in Figure 1 directly produces an alternating voltage which after rectification is suitable for the line without the use of intermediate transformers, it may often occur that the main direct current is not suitable for immediate use in the auxiliary windings. Furthermore, in using, for instance, the auxiliary commutators $K_{31}$ to $K_{34}$, heavy friction losses must be taken into consideration due to the considerable number of brushes, being at least four for each phase.

However, according to the invention these difficulties may be avoided by means of the embodiments diagrammatically shown in Figures 16 to 20 as applied to a bipolar machine. Suppose, in respect to Figure 1, that each of the phases $P_1$ to $P_6$ is divided into two halves, such as $a$ and $b$, each of which carry voltages of the same phase or, after shifting the terminals, opposite phases. It will be possible by a suitable composition of the different voltage vectors to obtain a closed voltage polygon as is the case in ordinary direct current machines. In Figure 16, $G_7$ designates a synchronous machine corresponding to the generator or motor $G_1$ in Fig. 1 and $P_{21}$ to $P_{26}$ six secondary windings of transformers, for instance corresponding to the transformers $T_{21}$ to $T_{24}$ in Figure 13 which windings are associated with a corresponding number of main commutators not shown on the drawings. For the sake of simplicity the circuits appertaining to the secondary windings are not shown in Figure 16. The appertaining primary windings consist of two winding groups $P_{11a}$ to $P_{16a}$ and $P_{11b}$ to $P_{16b}$ which constitute a twelve-phase system, in which pairs of windings, for instance $P_{11a}$ and $P_{11b}$, are in opposite phases, and, consequently, may be provided on the same transformer core. The primary windings are connected to twelve phase windings $P_{71a}$ to $P_{76a}$ and $P_{71b}$ to $P_{76b}$ of the synchronous machine $G_7$. In an ordinary six phase machine of the kind shown in Figure 11 such windings may be formed by dividing each phase into two halves and providing each half with individual terminals, the induced voltages in the two halves being in phase or, after shifting, in directly opposite phases. Each primary circuit is moreover connected to two consecutive segments of an auxiliary commutator $K_8$ having twelve mutually insulated segments $V_{1a}$ to $V_{6a}$ and $V_{1b}$ to $V_{6b}$. Preferably the commutator as well as the above described windings may be stationary. The segments cooperate with two brushes $B_1$ and $B_2$, which should rotate in relation to the segments. The brushes are connected through slip rings and stationary brushes with the windings $Q_{71}$ and $S_{71}$, provided on the main and auxiliary poles respectively, of the synchronous machine $G_7$. Compare also for instance the direct current excited windings $Q_{51}$ and $S_{51}$ of the generator $G_5$ in Figure 13. In order to relieve the commutator $K_8$ of the excitation components of the transformers, a separating generator $G_8$ is also provided, having twelve armature windings $P_{81a}$ to $P_{86a}$ and $P_{81b}$ to $P_{86b}$. This separating generator has the same object as the generator $G_6$ of Figure 13. However, according to Figure 12 the above mentioned separating generator may be substituted by an excitation generator.

In the figure the brushes $B_1$ and $B_2$ are shown of such width that they cover somewhat less than two segments. For the sake of simplicity the commutator shown in Figure 16 is arranged for a bipolar generator, but by increasing the number of segments and brushes in known manner, it may, of course, be arranged for any desired number of poles. The commutator is suitably designed for the same short-circuit period as the main commutators connected to the secondary circuits of the transformers.

To facilitate the understanding of the different current paths reference will be made in the following to the diagram of Figure 17. To render the diagram more distinct the secondary transformer windings $P_{21}$ to $P_{26}$ are here subdivided into two part phases $a$ and $b$ so that twelve secondary phases $P_{21a}$ to $P_{26a}$ and $P_{21b}$ to $P_{26b}$ are obtained. The phase windings $P_{81a}$ to $P_{86a}$ and $P_{81b}$ to $P_{86b}$ have further separate loads instead of common ones as shown in Figure 16. Thereby the explanation of the operation of the system will be greatly simplified.

As shown in Figure 17 the connection is supposed to form a so called loop or mesh connection in which the different coils are connected to consecutive commutator segments. It must, however, be observed that in this embodiment each so called coil comprises both a generator winding, such as $P_{71a}$, and a transformer winding, such as $P_{11a}$. In spite of this peculiar feature the system operates in a manner analogous to that in an ordinary mesh-connected continuous current machine.

In the instant shown in the figure the load current in the part phases indexed $1a$ to $6a$ has a certain direction, and in the part phases indexed $1b$ to $6b$ the same direction. A current being a composition of said branch currents will be closed over the brushes $B_1$, $B_2$ through the outer circuit formed by the windings $Q_{81}$, $S_{71}$, and $Q_{71}$.

In the position shown in the figure, the windings $P_{76b}$, $P_{16b}$ and $P_{71a}$, $P_{11a}$ are short-circuited by the brush $B_2$, whereas the windings $P_{76a}$, $P_{16a}$ and $P_{71b}$, $P_{11b}$ are short-circuited by the brush $B_1$.

To enforce the current through the external circuit a certain voltage is required which is supplied by the phases of the generator $G_7$. The primary windings of the transformers receive a voltage which is reduced in a corresponding degree. A corresponding difference in voltage is to be generated in the separating generator $G_8$, which then only takes up the excitation current of the transformers, whereas the load component is forced out into the external circuit.

In the preceding it has been assumed that the separating generator is provided with twice six phase windings, each of which is connected to one of the twelve part phases of the mesh-connection. When, in lieu thereof, a special excitation generator is provided, for instance, according to the principle shown in Figure 12, but differing from this embodiment by the excitation generator, such as $G_{10}$ according to Figure 19, feeding directly special tertiary windings $L_1$ to $L_6$ provided on the six transformers, the excitation generator needs only be provided with six phase windings $P_{101}$ to $P_{106}$, as according to the above, the twelve part windings $P_{31a}$ to $P_{36a}$ and $P_{31b}$ to $P_{36b}$ in the mesh-connection two and two are in the same phase or opposite phases respectively. The same condition is prevailing, if the phase windings of the excitation generator $G_{10}$ are each connected in shunt to one of the six secondary windings $P_{21}$ to $P_{26}$ in Figure 16. Moreover, it is possible to connect each of the six phase windings $P_{101}$ to $P_{106}$ to one of the two primary windings on each transformer, such as $P_{11a}$ to $P_{16a}$ in Figure 16. Figure 19 will be more closely explained in the following.

To control the excitation of the excitation or separating generator, auxiliary windings $Q_{83}$ and $Q_{103}$ on the main poles of the appertaining machine may be controlled through the intermedium of a relay $R_8$ and $R_{10}$ by divided brushes, by way of example, according to the French Patent 754,149 (relay 60), or by one or more differential transformers connected to one or more transformer circuits. Such differential transformers have been described above in connection with Figures 12 and 13, compare the transformers $T_7$ and $T_8$. The manner of connecting said transformers is diagrammatically shown in Figure 18, where only one part phase winding, indexed $1a$, is illustrated. The secondary winding $P_{21a}$ is connected to a commutator, from which, together with other commutators, direct current may be derived according to previous mentioned principles. At a proper excitation of that separating generator, the phase winding $P_{81a}$ of which is series-connected with the winding $P_{71a}$ the primary as well as the secondary commutator circuits of the transformer $T_{11a}$ will be relieved of the excitation components. As soon as disturbances arise, the differential transformer $T_{1a}$ will be passed by a differential component. The deviation impulses may be derived from a tertiary winding $m$ of the current transformer and, by convenient means as above described, may be brought to influence the excitation or separating generator.

The principle of mesh-connection may also be employed in the system of Figure 1 in case the direct current voltage or amperage of the main circuit 5, 6 is not suitable for feeding the windings $Q_1$ and $S_1$. In such a case current transformers such as $T_{41}$ to $T_{46}$, Figure 19, may be employed which may be connected according to the manner diagrammatically shown on the drawings. The reference characters follow the same principle as in Figure 16. Thus, $P_{41a}$ to $P_{46a}$ and $P_{41b}$ to $P_{46b}$ designate twelve secondary windings of the current transformers the primary windings of which are included in the main circuits $P_{91}$, $K_{91}$ and $P_{92}$, $K_{92}$ et cetera. As in this case also the pairs of windings are in the same phase or opposite phases, only six current transformers $T_{41}$ to $T_{46}$ are required, provided each current transformer has one winding indexed $a$ and one winding indexed $b$ on the secondary side. Also the current transformers should be separately excited in order to prevent the occurrence of excitation components on the primary side. As here the excitation generator $G_{10}$ supplies excitation energy to tertiary windings, one in each transformer, or directly to the primary sides, only six phase windings of the generator are required.

In Figure 20 the current paths in a system similar to Figure 19 are shown by means of a simplified diagram. To render the diagram as distinct as possible the primary windings are here subdivided into $a$ and $b$ groups so that also a primary twelve-phase system $P_{51a}$ to $P_{56a}$ and $P_{51b}$ to $P_{56b}$ is obtained. Also the six phase windings of the excitation generator $G_{10}$ are here shown subdivided in $a$ and $b$ groups so that twelve phases are obtained. Accordingly twelve transformers are represented each having a primary winding $P_{51a}$ to $P_{56a}$ and $P_{51b}$ to $P_{56b}$, a secondary winding $P_{41a}$ to $P_{46a}$ and $P_{41b}$ to $P_{46b}$, and a tertiary winding $L_{1a}$ to $L_{6a}$ and $L_{1b}$ to $L_{6b}$.

The above described circuit arrangement may, for instance, be used in the system of Figure 2, if the main voltage should not be suitable for feeding the auxiliary windings. In this event a mesh-connected commutator according to Figure 19 may be employed, having twenty-four segments and four brushes, corresponding to the four pole generator in Figure 2.

Each phase winding of the excitation generator should then deliver a voltage corresponding to the voltage drop between the terminals of the winding, that is, in the present case corresponding to the share of each phase in the voltage drop in the windings $Q_{101}$, $Q_{91}$, and $S_{91}$, said voltage being in turn proportional to the load current. The so-called excitation generator $G_{10}$ for the current transformer $T_{41}$ to $T_{46}$ has thus substantially the same object as the separating generator $G_6$ in Figure 13. It should thus be provided with a series-excited main excitation winding $Q_{101}$ and with the necessary compensation windings $S_{101}$ and/or adjusting windings $Q_{103}$. Conveniently relays may be disposed so as to secure proper operation by controlling the auxiliary windings $Q_{103}$ by means of brushes or differential transformers according to previously indicated principles.

It has been presupposed above that the system comprises at least one machine operating as generator or motor in the actual sense of these words, thus supplying or delivering active effect or power. The invention is, however, not limited to such systems, but may also find application in other systems, where the active effect is supplied for instance as a direct current effect, which is converted into direct or alternating current effect of other voltage or vice versa.

I claim:—

1. A direct current system comprising an alternating current machine of the synchronous heteropolar type having a plurality of phase displaced armature windings, a plurality of alternating current circuits each controlled by one of said armature windings, main field pole pieces and intermediate auxiliary pole pieces, the last named pieces being arranged for setting up commutation voltages in the armature windings, commutators cooperating with said alternating current circuits to separately commutate the voltages in the alternating current circuits and to compose the same into a substantially constant unidirectional voltage, said commutators being provided with brushes arranged to periodically short circuit the alternating current circuits during finite intervals of time which form a relatively great part of the half period.

2. A direct current system comprising an alternating current machine of the synchronous heteropolar type having a plurality of phase displaced armature windings, a plurality of alternating current circuits each controlled by one of said armature windings, main field pole pieces and intermediate auxiliary pole pieces, the last named pieces being arranged for setting up commutation voltages in the armature windings, commutators cooperating with said alternating current circuits to separately commutate the voltages in the alternating current circuits and to compose the same into a substantially constant unidirectional voltage, said commutators being provided with brushes arranged to periodically short circuit the alternatng current circuits during finite intervals of time which form a relatively great part of the half period, said auxiliary pole pieces being adapted to induce in each armature winding an alternating voltage having finite zero voltage intervals at no load and at load.

3. A direct current system comprising an alternating current machine of the synchronous heteropolar type having a plurality of phase displaced armature windings, a plurality of alternating current circuits each controlled by one of said armature windings, main field pole pieces and intermediate auxiliary pole pieces, the last named pieces being arranged for setting up commutation voltages in the armature windings, commutators cooperating with said alternating current circuits to separately commutate the voltages in the alternating current circuits and to compose the same into a substantially constant unidirectional voltage, said commutators being provided with brushes arranged to periodically short circuit the alternating current circuits during finite intervals of time which form a relatively great part of the half period, said auxiliary poles having exciting windings included in the commutator circuit carrying said unidirectional voltage.

4. A direct current system comprising an alternating current machine of the synchronous heteropolar type having a plurality of phase displaced armature windings, a plurality of alternating current circuits each controlled by one of said armature windings, main field pole pieces and intermediate auxiliary pole pieces, the last named pieces being arranged for setting up commutation voltages in the armature windings, commutators cooperating with said alternating current circuits to separately commutate the voltages in the alternating current circuits and to compose the same into a substantially constant unidirectional voltage, said commutators being provided with brushes arranged to periodically short circuit the alternating current circuits during finite intervals of time which form a relatively great part of the half period, said auxiliary poles carrying exciting windings disposed in slots and enclosing less than the whole pole piece.

5. A direct current system comprising an alternating current machine of the synchronous heteropolar type having a plurality of phase displaced armature windings, a plurality of alternating current circuits each controlled by one of said armature windings, main field pole pieces and intermediate auxiliary pole pieces, the last named pieces being arranged for setting up commutation voltages in the armature windings, commutators cooperating with said alternating current circuits to separately commutate the voltages in the alternating current circuits and to compose the same into a substantially constant unidirectional voltage, said commutators being provided with brushes arranged to periodically short circuit the alternating current circuits during finite intervals of time which form a relatively great part of the half period, and non-magnetic members between said main pole pieces and said auxiliary pole pieces and compensating windings disposed in slots in said main pole pieces and in slots in said non-magnetic members.

6. A direct current system comprising an alternating current machine of the synchronous heteropolar type having a plurality of phase displaced armature windings, a plurality of alternating current circuits each controlled by one of said armature windings, main field pole pieces and intermediate auxiliary pole pieces, the last named pieces being arranged for setting up commutation voltages in the armature windings, commutators cooperating with said alternating current circuits to separately commutate the voltages in the alternating current circuits and to compose the same into a substantially constant unidirectional voltage, said commutators being provided with brushes arranged to periodically short circuit the alternating current circuits during finite intervals of time which form a relatively great part of the half period, and compensating windings disposed in slots in said main pole pieces and having a magnetic axis coinciding with the center of said auxiliary pole pieces.

7. A direct current system comprising an alternating current machine of the synchronous heteropolar type having a plurality of phase displaced armature windings, a plurality of alternating current circuits each controlled by one of said armature windings, main field pole pieces and intermediate auxiliary pole pieces, the last named pieces being arranged for setting up commutation voltages in the armature windings, commutators cooperating with said alternating current circuits to separately commutate the voltages in the alternating current circuits and to compose the same into a substantially constant unidirectional voltage, said commutators being provided with brushes arranged to periodically short circuit the alternating current circuits during finite intervals of time which form a relatively great part of the half period, and compensating windings disposed in slots in said main pole pieces and having a magnetic axis coinciding with the center of said auxiliary pole pieces and adapted to produce the desired zero voltage intervals in said armature windings.

8. A direct current system comprising a plurality of static transformers having primary and secondary windings, a direct current circuit, a plurality of commutators individually connecting certain of said windings in series in said direct current circuit, an alternating current machine of the heteropolar type having a set of armature windings associated with the others of said transformer windings and having pole pieces carrying windings adapted to change the wave form so as to compensate for incorrect commutation in said commutators.

9. A direct current system comprising a plurality of static transformers having primary and secondary windings, a direct current circuit, a plurality of commutators individually connecting certain of said windings in series in said direct current circuit, an alternating current machine of the heteropolar type having a set of armature windings associated with the others of said transformer windings and having main pole pieces and auxiliary pole pieces carrying compensating slot windings having a magnetic axis coinciding with the axis of the auxiliary pole pieces and adapted to change the wave form so as to compensate for incorrect commutation in said commutators.

10. A direct current system comprising a plurality of static transformers having primary and secondary windings, a direct current circuit, a plurality of commutators individually connecting certain of said windings in series in said direct current circuit, an alternating current machine of the heteropolar type having a set of armature windings associated with the others of said transformer windings and having pole pieces carrying windings adapted to change the wave form so as to compensate for incorrect commutation in said commutators, and means to energize said last mentioned windings with direct current proportional to the load in said direct current circuit.

11. A direct current system comprising a plurality of static transformers having primary and secondary windings, a direct current circuit, a plurality of main commutators individually connecting certain of said windings in series in said direct current circuit, an alternating current machine of the heteropolar type having a set of armature windings associated with the others of said transformer windings and having pole pieces carrying compensating windings adapted to compensate for incorrect commutation, a second set of commutators individually connecting said armature windings in series with the compensating windings whereby said compensating windings are energized with direct current proportional to the load in said direct current circuit.

12. In a direct current system in combination, a main alternating current circuit including an induced winding and a transformer having a winding connected to said first winding, a commutator associated with said main circuit for rectifying the alternating voltages and commutating the alternating currents therein, an auxiliary induced winding connected in shunt with said commutator, and means exciting said auxiliary induced winding to produce a wave form such that the reactive current components are shunted around the commutator.

13. In a direct current system in combination, a main alternating current circuit including an induced winding and a transformer having a winding connected to said first winding, a commutator associated with said main circuit for rectifying the alternating voltages and commutating the alternating currents therein, an auxiliary heteropolar generator connected to said main circuit, and means exciting said generator to produce a wave form such that the reactive current components are shunted around the commutator.

14. In a direct current system in combination, a main alternating current circuit including an induced winding and a transformer having a winding connected to said first winding, a commutator associated with said main circuit for rectifying the alternating voltages and commutating the alternating currents therein, an auxiliary heteropolar generator having an induced winding shunted across said commutator, and means exciting said generator to produce a wave form in said induced winding such that the excitation current components are shunted around said commutator.

15. In a direct current system in combination, a main alternating current circuit including an induced winding and a transformer having a winding connected to said first winding, a commutator associated with said main circuit for rectifying the alternating voltages and commutating the alternating currents therein, and an auxiliary heteropolar generator having an induced winding shunted across said commutator so as to shunt the excitation current components around said commutator, said auxiliary generator having pole pieces carrying a positive compound winding connected in the direct current circuit of the said commutator for increasing the phase voltage of said auxiliary generator to compensate for increased voltage drop in the last mentioned circuit at load.

16. In a direct current system, a dynamo electric machine provided with main pole pieces and intermediate auxiliary pole pieces, and a plurality of induced windings, transformers having primary and secondary windings, one winding of each of said transformers being connected to each of said induced windings, commutators connected to the others of said transformer windings for rectifying and composing the transformer voltages to a unidirectional voltage, field windings associated with said pole pieces, and means for supplying a direct current proportional to the load to said field windings, so as to maintain zero voltage intervals and to produce auxiliary voltages adapted to ensure sparkless commutation.

17. In a direct current system, a dynamo electric machine provided with main pole pieces and intermediate auxiliary pole pieces and a plurality of induced windings, transformers having primary and secondary windings, one winding of each of said transformers being connected to each of said induced windings, commutators connected to the others of said transformer windings for rectifying and composing the transformer voltages to a unidirectional voltage, field windings associated with said pole pieces, and means for supplying a direct current proportional to the load to said field windings, so as to maintain zero voltage intervals and to produce auxiliary voltages adapted to ensure sparkless commutation, said commutators being connected in series so as to compose the commutated voltages into a substantially constant unidirectional voltage.

18. In a direct current system, a dynamo electric machine provided with main pole pieces and intermediate auxiliary pole pieces and a plurality of induced windings, transformers having primary and secondary windings, one winding of each of said transformers being connected to each of said induced windings to form an alternating current circuit, and a commutator having a plurality of segments, each circuit including two adjacent commutator segments and the circuits being interconnected to form a closed winding system.

19. In a direct current system, a dynamo electric machine provided with main pole pieces and intermediate auxiliary pole pieces and a plurality of induced windings, transformers having primary and secondary windings, one winding of each of said transformers being connected to each of said induced windings, said one winding being divided into two parts which are connected to induced windings of opposite phase to form alternating current circuits, and commutators connected in each of said circuits for rectifying the voltages therein, said commutators being interconnected to compose said rectified voltages into a substantially constant unidirectional voltage.

20. In a direct current system, a dynamo electric machine provided with main pole pieces and intermediate auxiliary pole pieces and a plurality of induced windings, transformers having primary and secondary windings, one winding of each of said transformers being connected to each of said induced windings to form an alternating current circuit, a commutator having a plurality of segments, each circuit including two adjacent commutator segments and the circuits being interconnected to form a closed winding system, and an auxiliary induced winding shunted across adjacent commutator segments.

21. In a direct current system in combination, a main alternating current circuit including an induced winding and a transformer having a winding connected to said first winding, a commutator associated with said main circuit for rectifying the alternating voltages and commutating the alternating currents therein, an auxiliary heteropolar generator connected to said main circuit, and means exciting said generator to produce a wave form such that the reactive current components are shunted around said commutator, said auxiliary generator having main pole pieces and intermediate auxiliary pole pieces, said auxiliary pole pieces carrying a compensating winding having its magnetic axis through the main pole pieces.

22. In a direct current system in combination, a main alternating current circuit including an induced winding and a transformer having a winding connected to said first winding, a commutator associated with said main circuit for rectifying the alternating voltages and commutating the alternating currents therein, an auxiliary heteropolar generator connected to said main circuit, means exciting said generator to produce a wave form such that the reactive current components are shunted around said commutator, said auxiliary generator having main pole pieces and intermediate auxiliary pole pieces, said main pole pieces carrying a winding, and a relay operated by impulses occurring upon incorrect commutation and adapted to control the energization of the last mentioned winding.

23. In a direct current system in combination, a main alternating current circuit including an induced winding and a transformer having a winding connected to said first winding, a commutator associated with said main circuit for rectifying the alternating voltages and commutating the alternating currents therein, an auxiliary heteropolar generator connected to said main circuit, means exciting said generator to produce a wave form such that the reactive current components are shunted around said commutator, said auxiliary generator having main pole pieces and intermediate auxiliary pole pieces, said main pole pieces carrying a winding, and a relay operated by impulses caused by reactive current components in the commutator circuits and adapted to control the energization of the last mentioned winding.

24. In a direct current system in combination, a main alternating current circuit including an induced winding and a transformer having a winding connected to said first winding, a commutator associated with said main circuit for rectifying the alternating voltages and commutating the alternating currents therein, and an auxiliary heteropolar generator having induced windings in induced relationship with said transformers and adapted to supply the excitation energy thereof.

25. In a direct current system in combination, a main alternating current circuit including an induced winding and a transformer having a winding connected to said first winding, a commutator associated with said main circuit for rectifying the alternating voltages and commutating the alternating currents therein, an auxiliary heteropolar generator connected to said main circuit, and means exciting said generator to produce a wave form such that the reactive current components are shunted around said commutator, said auxiliary generator having main pole pieces and auxiliary pole pieces, said auxiliary pole pieces carrying a commutation winding included in the direct current commutator circuit and adapted to assist commutation at load.

26. In a direct current system in combination, a main alternating current circuit including an induced winding and a transformer having a winding connected to said first winding, a commutator associated with said main circuit for rectifying the alternating voltages and commutating the alternating currents therein, an auxiliary heteropolar generator connected to said main circuit, and means exciting said generator to produce a wave form such that the reactive current components are shunted around said commutator, said auxiliary generator having pole pieces carrying a negative compound winding included in the direct current commutator circuit and adapted to reduce the electromotive forces induced in the transformers at load.

JOHAN EMIL ALM.